April 23, 1957 G. H. PALM 2,789,838
PIPE IN SOCKET TYPE HOSE COUPLER WITH CHECK VALVE
Filed Aug. 24, 1951 2 Sheets-Sheet 1

Inventor.
George H. Palm.
By Hill & Hill
Attys.

April 23, 1957
G. H. PALM
2,789,838
PIPE IN SOCKET TYPE HOSE COUPLER WITH CHECK VALVE
Filed Aug. 24, 1951
2 Sheets-Sheet 2
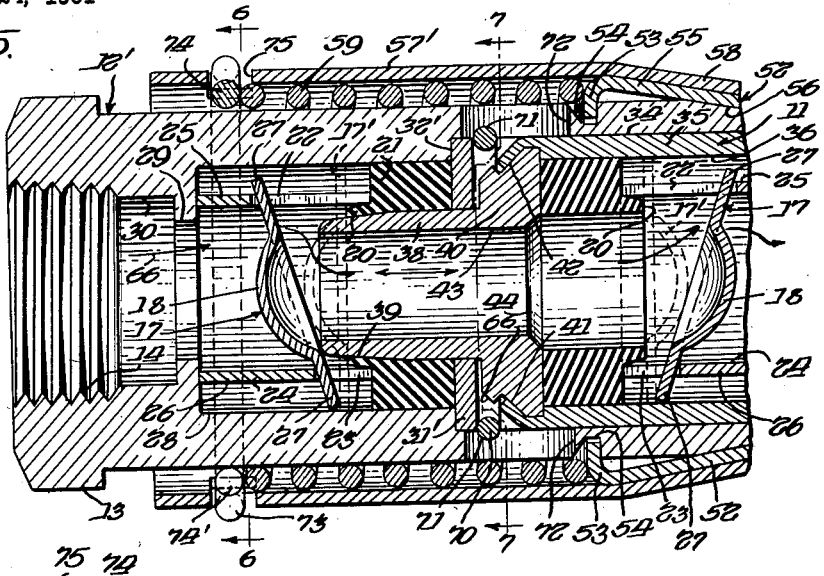
Inventor:
George H. Palm.

United States Patent Office 2,789,838
Patented Apr. 23, 1957

2,789,838

PIPE IN SOCKET TYPE HOSE COUPLER WITH CHECK VALVE

George H. Palm, Chicago, Ill.

Application August 24, 1951, Serial No. 243,502

8 Claims. (Cl. 284—19)

This invention relates to coupling devices for hose and similar flexible conduit, and also to a coupling for pipes, tubes, rods, cables, wires and the like, and more particularly for hose coupler for a fluid under pressure so that when the hose is disconnected by the coupler from the source of pressure, the fluid is retained under pressure.

A principal object of the invention is to provide an improved hose coupler arranged for quick connection and disconnection of the coupled sections.

Another object of the invention is to provide a coupling which may be easily and quickly coupled and uncoupled by a slidable motion or the push or pull of the parts to be coupled and when applied to a conduit, pipe or tube, the coupling is fluid tight.

It is also another object of the invention to provide a hose coupler having a yielding sealing member and having also check valve means in the connector or member of the coupling which is permanently attached to the supply line as well as to the line to which it is connected, the sealing member in both instances serving as a seat for the check valve when the coupling is disconnected and serving to seal the connection when the coupling parts are operatively engaged with the check valves open.

A further object of the invention is to provide a hose coupler including a yielding sealing member so arranged that it must be compressed when the parts of the coupling are operatively connected and latch means arranged to hold the parts in connected relation with the sealing member compressed.

Another object of the invention is to provide coupling device such as a hose coupler with a minimum number of parts and of sturdy construction and design for simple and economical manufacture and assembly.

Another object of the invention is to provide a coupling including male and female coupling members provided with simple latching means which may be operated with a sliding movement of quickly attaching and detaching the coupling.

Another object of the invention is to provide a simple check valve arrangement for the connectors of the coupling when applied to a conduit and the like under fluid so that as the connectors are coupled together, the conduit is open to the flow of fluid in a predetermined direction; and upon the uncoupling of the coupling device, the fluid under pressure is sealed in either of the conduits to which the parts of the coupling are connected.

Another object of the invention is to provide a simple spring biased latching means for the quick connection or disconnection of the coupled sections or connectors.

According to the invention there is provided a two-part coupling including male and female connectors adapted for coupling pipes, tubes, rods, wires and the like. The two-part coupling preferably comprises a male and female connector complementally formed for coupling for quick connection or disconnection and in which the parts of the coupling are sealed against leakage. In order to accomplish this, both of the connectors are provided with a simple form of check valve which is sealed, when disconnected, by the action of the fluid under pressure within the conduit to which the coupling is attached and in which one of the check valves is opened as the connectors are coupled together, the other check valve opening under the action of the fluid within the conduit to which it is coupled by the fluid traveling in a predetermined direction. The latching means and the sealing means for the connectors also permit swiveling of the connectors with respect to each other and the coupling is completely sealed.

Other objects and advantages of the constructions herewith shown and described will be obvious to those skilled in the art from the disclosure herein given.

To this end, my invention consists of a novel construction, arrangement and combination of parts wherein like reference characters indicated like or corresponding parts:

Fig. 5 is an axial sectional view of another embodiment of a hose coupling, similar to that of Fig. 1, embodying this invention and showing the parts in coupled relationship, and further illustrating modifications in construction to permit servicing and repair of the coupling;

Fig. 6 is a sectional view taken along line 6—6 of Fig. 5, looking in the direction of the arrows, and illustrating the spring ring connections for detachably mounting the latching means;

Fig. 7 is a sectional view taken along line 7—7 of Fig. 5 looking in the direction of the arrows, and illustrating the detachable mounting of the sealing member for the coupling; and, Fig. 8 illustrates a finger of the latching means for connecting and disconnecting of the coupling sections.

Figures 1, 2, 3, 4:
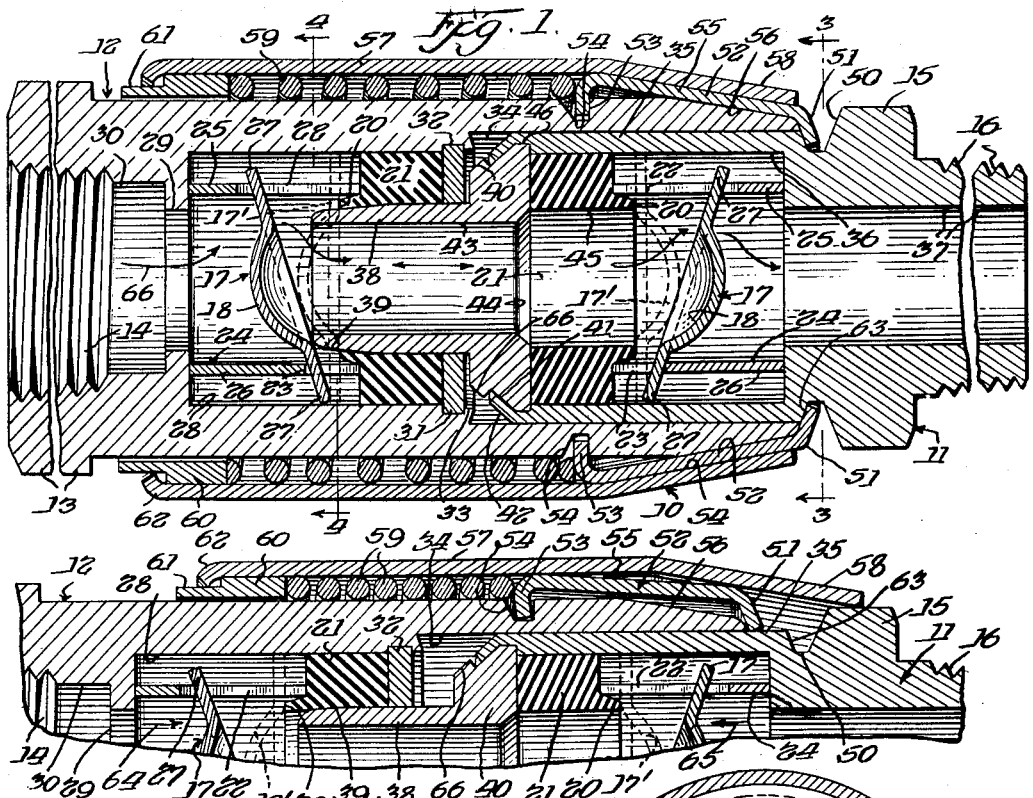
Fig. 1 is an axial sectional view of a hose coupling embodying this invention, showing the parts in coupled relation.
Fig. 2 is a partial sectional view of the coupling of Fig. 1 and illustrates the arrangement of the parts as the coupling is connected and disconnected.
Fig. 3 is a sectional view, taken along line 3—3 of Fig. 1, looking in the direction of the arrows, and illustrating the arrangement of the fingers of the latching means.
Fig. 4 is a sectional view, taken along line 4—4 of Fig. 1, looking in the direction of the arrows, and illustrating the construction of the check valve and valve guides.

The hose coupler of this invention is applicable to hose lines or conduits which convey water, oil, air, grease or other fluids under pressure, and it is constructed to provide a sealed joint adapted to withstand substantially fairly high pressure when the parts of the coupler are in coupled relationship. The hose coupler also includes a simple fastening means which permits the parts to be readily separated when desired. The assembled coupling 10 comprises two principal parts or members which are the male member or connector 11 and the female member or connector 12 is securely, although it may be detachably, associated with a head or plug 13 threaded at 14 for connection of a supply pipe, conduit, or hose (not shown) for its engagement with the female connector 12. The male connector 11 is also provided with a head or plug 15 which is securely associated therewith although it may be detachably connected thereto, and adapted for the application of a wrench, and the threaded nipple 16 adapted to be coupled to a complementally formed coupling with the supply pipe or hose to which it is coupled. It is to be understood that it is within the scope of the invention that the pipe couplings such as the female connection 12 and the male connection 16 may be reversed, or male and female couplings used on both of the male and female connectors, or any form of couplings desired, as is well understood in the art without departing from the scope of the invention. The simple form of connections described has been shown solely for the purpose of illustration.

The female connector 12 houses a check valve 17 having a dome shaped portion 18 and an annular shaped portion 19 adapted to engage a conical shaped seat 20 of a gasket 21. The valve 17 is mounted for movement angularly and axially in slots 22 and 23 of a valve guide 24 substantially cylindrical in shape and having flattened portions 25 and 26 in which the slots 22 and 23 are formed. The check valve 17 is formed with radially extending lugs 27 adapted to be mounted within the slots 22 and 23. Referring to Figs. 1 and 4, the slot 22 is deeper than the slot 23 to permit angular movement of the check valve 17 as shown in Fig. 1, the purpose of which will be described later with respect to the operation of the coupling member.

The valve guide 24 is mounted in a counterbore 28 connected to the bore 29 which in turn is connected to the threaded counterbore 30 which is coupled to the hose or conduit to which the female connector 12 is attached.

The seal or gasket 21 is mounted in the counterbore 28 after the valve guide 24 has been mounted and the check valve 17 inserted in the slots 22 and 23. The gasket 21 is held in place by a washer 31 inserted in a complementally formed counterbore 32 and staked in place by forming the annular rim 33, as shown in Fig. 1. The female connector is also formed with a large counterbore 34 adapted to receive a complementally formed cylindrical portion 35 of the male connector 11. This portion of the male connector is provided with a counterbore 36, similarly dimensioned as the counterbore 28 to receive likewise a gasket 21, valve guide 24, and valve 17. As these parts are identical with those previously described for the female connector 12, like reference characters will indicate the same or similar parts. Further description and the method of assembly is believed unnecessary.

The counterbore 36 is connected to a bore 37 which in turn is connected to the hose or conduit to which the male connector of the coupling is affixed. The male member 11 at its free end is provided with an elongated cylindrical portion 38 complementary formed to the bore of the washer 32 and the bore of the gasket 21, so that it may be inserted as illustrated in Fig. 1 and still provide a seal so that there is no leakage from the coupling when connected. The outer end of the cylindrical portion 38 is tapered at 39 to provide for ease of insertion within the bore of the gasket 21 which is slightly smaller than the outer diameter of the member 38 in order to provide a tight seal. As the gasket 21 is formed from suitable resilient material, the gasket is deformed sufficiently for the entrance of the member 38 and the sealing thereof.

The rear end of the member 38 has an enlarged portion 40 formed as a frustrum of a cone and also provided with an annular groove 41 as shown in Fig. 1 complementally formed to receive an annular portion 42 formed on the outer end of the cylindrical portion 35. The member 38 is provided with a bore 43 having a counterbore 44 connecting a bore 45 of the gasket 21.

In assembling, the valve guide 24, the check valve 17 and the gasket 21 is inserted within the bore 36 of the male connector 11, and the enlarged portion 40 of the member 38 is inserted in the counterbore 46 of the cylindrical portion 35, after which the annular portion 42 is staked in place within the annular groove 41 by spinning or other suitable press operation. It is evident that this provides a simple method of assembling the gasket, check valve and guide therefor in place. The operation of the check valve will be described later with reference to the operation of the assembled coupling. It is to be understood that if it is desired, a check valve shall be applied only to the end of a conduit which has a fluid under pressure and that the gasket 21, check valve 17 and guide 21 therefor in the male connector 11 may be dispensed with, without departing from the scope of the invention where it is desired that a simple and inexpensive coupling shall have a check valve in only one of the members. It is also to be understood that where a very simple coupling is desired, the check valves and associated parts may be dispensed with entirely. When it is desired to conserve the fluid within the member to which the male connector is attached, it is to be understood that the gasket 21, check valve 17 and its guide 24 may then be assembled within the male connector.

Referring to Figs. 1, 2, 3, and 4, a simple and inexpensive form of latching means for quickly attaching and detaching of the male and female connectors together will be described. The male connector 11 is provided with an annular groove 50 contiguous to the head 15 which usually is hexagonal in shape and adapted for the reception of a conventional wrench. The groove 50 is substantially V-shape and is formed, as shown in Fig. 1, to complementally receive an inturned end 51 of each of the latch fingers 52. The latch fingers 52, as illustrated in Fig. 8 are preferably six in number to complete the periphery when latched in position, as shown in Figs. 1 and 3, for latching the male and female connectors together. The outer end of the inturned portion 51 is complementally formed to the inner periphery of the groove 50 and with sufficient clearance so that in the coupled position of the male and female connectors, as shown in Fig. 1, the connectors may swivel with respect to each other if desired, while still being sealed. It is to be understood that if swiveling of the male and female connectors is not desired, the bottom of the groove may be, for example, formed as a hexagon, and when the inner ends of the fingers 51 are complementally formed to the hexagonal groove, relative swiveling movement of the connectors is prevented. The inner end of the fingers 52 is also provided with a radially inturned portion 53 (Fig. 8) complementally formed to be received in an annular groove 54 formed in the circumference of the female member or connector 12, as shown in Fig. 1. An intermediate portion 55 of the finger 52, when assembled as illustrated in Figs. 1 and 3, forms the face of a frustrum cone complementally formed to a conical end portion 56 of the outer end of the female connector 12. The fingers 52 are assembled, as shown in Figs. 1 and 3, about the circumference of the female connector 12, and a sleeve member 57 is applied as shown. The sleeve member has a conical end portion 58 complementally formed to the outer periphery of the assembled fingers 52 as shown in 51. A helical coiled spring 59 is assembled, as shown in Fig. 1, to abut against the portion 53 of the fingers and extends about the circumference of the female connector 12 and within the space formed by the outer periphery of the female connector 12 and the sleeve member 57. An annular ring 60 is positioned about the periphery of the female connector and has an annular groove 61 adapted to receive an inturned end 62 of the sleeve member 57.

It is preferred to assemble the members, making up the latching means, by first assembling the ring 60 in place, then successively the spring 59, and the fingers 52, after which the sleeve member 57 is assembled to retain the fingers in place. The ring 60 is then moved a short distance axially toward the right to compress the spring 59 slightly, after which the end 62 is staked in place as shown in Fig. 1, by spinning over the free end 62. Although the sleeve member 57 is preferably formed as a sheet metal part, suitably press formed, it is to be understood that it is within the scope of the invention that it may be formed from a flat sheet partially rolled to shape and adapted to be assembled about the parts forming the latching means, after which the split sleeve member may then be formed to shape securing the members together.

Referring to Figs. 1 and 2, the operation of the completed coupling member and the manner in which it is coupled and uncoupled will be described. If the parts of the coupling member are separated, and it is desired to couple the members to the position shown in Fig. 1, the sleeve member 57 is moved longitudinally axially to the right, as shown in Fig. 2. The member 15 of the male connector 11 is so formed that the conical end 58 is free to clear the head 15. As the sleeve member is moved to the right, and as the male coupling member 11 is also pulled to the right slightly, as shown, the outer end 51 of each of the fingers tends to ride up the inclined surface 63 of the groove 50, the fingers 52 swinging outwardly radially, as the inner ends 53 are pivoted in the annular groove 54. The pressure of the compressed spring 59 tends to maintain the fingers 52 in the outer position, as shown in Fig. 2, so that sufficient clearance is provided for the cylindrical portion 35 to be withdrawn through the enlarged opening provided by the radially outwardly movable fingers 52. With the parts located as shown in Fig. 2, the male connector 11 is then withdrawn from the female connector. If fluid under pressure is connected to the female connector 12, the pressure of the fluid in the direction of the arrow 64, Fig. 2, will close the check valve 17 to the dotted position 17', preventing leakage of the fluid. Likewise, if fluid is in the conduit to which the male connector 11 is connected when the coupling is separated, the pressure as indicated by the arrow 65 will move the check valve 17 of the male connector to the dotted position 17', so that a tight seal is formed between the annular position 19 of the check valve and the conical-shaped seal 20 of each of the gaskets 21.

When it is desired to couple the male and female connectors 11 and 12 together, the sleeve member 57 is moved to the right, as shown in Fig. 2, and the male member inserted. As the male member is moved to the left within the bore 34 of the female coupling, the outer ends 51 of the latching fingers 52, if they should be extending slightly over the bore, are engaged by the inclined edge 66 formed by the conical periphery of the engaged portion 40 of the elongated male portion 38 to cause the fingers 52 to move to the position as shown in Fig. 2. As the pressure of the compressed spring tends to maintain the fingers in this position, the male connector 11 may be complementally inserted to the position shown in Fig. 1, wherein the elongated portion 38 extending through the washer 32 is being sealed by the gasket 21. When fully inserted, the sleeve member is released and the pressure of the spring forces the sleeve member to the left and the shape of the conical portion 58 biases the ends 51 of the latch fingers 52 within the groove 50. The pressure of the spring is such as to firmly latch the fingers in position so that the male and female connectors may not be disengaged by vibrations, or in any manner, except by the manipulation of the sleeve 57 to disengage the connectors.

With the male and female connectors assembled, as shown in Fig. 1, the inner end of the portion 38 of the male connector engages the check valve 17, as shown from its dotted closed position 17' Fig. 1, to open it to the angular position as shown in the solid lines, Figs. 1 and 2, by pivoting the check valve about the bottom edge of the slot 23, the check valve being guided by the lug 27 within the upper groove 22 and retained in position at the lower end by the lug 27 in the groove 23. With fluid under pressure connected to the female connector 12, the liquid flows in the direction of the arrows 66 and through the spaces 67 provided between the outer periphery of the check valve 17 and the inner periphery of the valve guide 24 contiguous thereto, as shown in Figs. 4 and 1, into the bores 43 and 44, through the inner bore 45 of the gasket 21 of the male member, and the pressure of the fluid forces the check valve 17 from the dotted position 17' as shown in Figs. 1 and 2, to the solid position so that the fluid flows through the passages 67, as described with reference to Fig. 4 of the fluid flow within the female member 12. The fluid then flows into the bore 37 being discharged into the conduit which is connected to any suitable tool or device for which the coupling is suitable.

It is obviously evident that a simple form of coupling device has been constructed which provides for the flow of oil, air or other fluid within the coupled hose coupling and which when disconnected in the manner described will quickly shut off and seal the fluid by means of the check valve construction 17 and its associated gasket 21, as described in connection with both the male and female connectors 11 and 12. Furthermore, there has been described a simple form of coupling device or the like which couples quickly, merely for attachment of complementally formed coupling members, by the simple manipulation of the sleeve 57 to connect and disconnect the latch fingers 52 of one coupling member to and from the complementally formed portion of the other member to which it is adapted to be connected.

The form of hose coupler described with reference to Figs. 1, 2, 3, 4 and 8 illustrates a preferred embodiment in which the parts have been assembled and may not be readily serviced and repaired, and as the parts are simply constructed, if it is desired to repair the coupling, it may be considered cheaper to replace the entire coupling or portion thereof which is not in need of repair. Referring to Figs. 5, 6, 7 and 8, there is illustrated another embodiment of my invention in which certain parts of the hose coupler which are not frequently in need of repair may be readily serviced and maintained. It is apparent that the check valve construction and the associated gasket 21 of the male connector 11, as described with reference to Figs. 1 and 5, is not subject to wear as is the gasket 21 of the female member 12. It is therefore an important feature of my invention to provide a simple means for the ready replacement of the gasket 21 or the check valve 17 of the modified female member 12', if it becomes worn so that an effective seal is provided between the part 38 of the male member 11 and the seal 21 of the female connector. In order to accomplish this, the female member 12' is provided with an enlarged counterbore 32' to receive a larger diameter washer 31'. A spring ring 70 is mounted in an annular groove 71, as shown in Figs. 5 and 7, to detachably secure the gasket 21 in place. When the gasket 21 becomes worn, and the check valve 17 defective, it is only necessary to detach the spring ring 70 from the groove 71 by inserting a suitable tool in either of the holes 72 so that it may be removed through the bore 34, after which the washer 30' and gasket 21' may be removed as well as the check valve 17 and valve guide 24 for inspection and servicing. When new parts are replaced, they are replaced in the reverse order and the spring ring 70 slipped in place thus detachably mounting these members for inspection and repairing.

If the latch fingers 52 or the spring 59 should become unserviceable, a spring ring 73, shaped as illustrated in Fig. 6, has been provided for permitting the attachment and detachment of the sleeve 57' and associated members of the latching means. The split ring 73 is provided with lugs 74 and 74' as shown, adapted to extend radially inwardly in slots 75 and formed in the periphery of the sleeve as shown in Figs. 5 and 6. In order to detach the sleeve 57, the ends 74' are sprung outwardly permitting the split ring 73 to be detached. When detached in this manner, the sleeve 57', fingers 52 or spring 59 may be inspected and serviced as needed. The parts are then assembled in the reverse order, and the split ring 73 assembled in position as shown in Figs. 5 and 6. As the operation and method of assembling and disassembling the coupling of the embodiment of Figs. 5 through 7 is the same, as described with reference to the embodiment of Fig. 1, further description thereof is believed unnecessary.

Although normally it is not desired to replace portions of the latching means, as shown in Fig. 1, it is to be understood that these parts may be inspected and replaced by simply unstaking the portion 62 from the ring 60, after which the portions of the latching means of Fig. 1 may be disassembled and inspected, replaced and reassembled. Likewise, if necessary, the gasket 21 and valve members of the male member 11 may also be refactory inspected and replaced by unstaking the staked portion 42 from the member 38 which allows for disassembly, inspection and replacement of these members, if desired.

It is obvious from the above description that a hose coupler has been disclosed which has relatively few parts and that the coupler has been so constructed that certain parts for the male and female connectors, such as gasket 21 and valve parts 17 and 24, are identical to permit economical manufacture and replacement, as desired.

It is also evident that there has been described a simple form of male and female connectors which are sealed against leakage by providing a simple form of check valve which operates as the male and female connectors are coupled and uncoupled.

It is also obvious that a simple form of latching means has been provided which by simple axial or slidable motion of the sleeve member thereof permits the quick connection or disconnection of the coupling member.

It is also evident that there has been disclosed a simple form of coupler in which the parts thereof may be simply and quickly formed by metal stamping or standard screw machine operations.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

1. A coupling comprising tubular male and female connectors complementally formed and adapted to be coupled and uncoupled, the outer end surface of the female connector terminating in a conical taper, latching means including an annular groove formed in the exterior of said female member rearwardly of said conical taper, a plurality of separate latching fingers having their medial portions overlying said conical taper and when in latching position completely encompassing said taper, the inner end of each of said fingers having a portion extending radially inwardly and pivotally mounted in the groove in said female member, an annular groove formed in the exterior of the male member forwardly of said conical taper of said female connector when coupled, a radially inwardly extending leg on the outer end of each of said latching fingers, the pivotal mounting of said fingers in the annular groove of said female member serving to permit the outer ends of said fingers to move radially inwardly and outwardly with respect to the groove of said male member as the connectors are coupled and uncoupled, said latch means further including sleeve means mounted for axial sliding movement with relation to the outer surface of the female connector and formed in its body part complementally to said female connector and at its outer end complementally to the conically tapering portion of said latching fingers and concentric therewith, said sleeve having radially inwardly extending abutment means formed adjacent to its inner end, a helically coiled spring encircling said female member and encompassed by said sleeve member, said spring operatively disposed between and directly engaging said abutment means and the said radially inwardly extending portions of said latching fingers, whereby said sleeve is urged in position to force said latching fingers against said female conical taper and the outer ends of said latching fingers into latching position with the groove of said male member.

2. A coupling as claimed in claim 1, wherein the abutment means for the inner end of said spring includes a ring member embracing said female member and axially slidable relatively thereto.

3. A coupling as claimed in claim 1, wherein the sleeve means is provided adjacent to its inner end with circumferentially spaced slots, and including a detachable retainer ring comprising radially inwardly extending portions, said radially inwardly extending portions complementally formed to said circumferentially spaced slots to be detachably received therein.

4. A coupling as claimed in claim 1, wherein the tubular male and female connectors are provided with axially extending bores and adapted to be connected to a line containing fluid under pressure, and including annular gasket means for sealing said connectors together, said gasket means including an annular valve seat, valve means including a movable member including diametrically extending lugs and operatively mounted for axial and angular movement and slotted guide means therefor operatively mounted within the bore of said female connector, said slotted guide means including oppositely flattened portions provided with axial extending slots, one of said slots being longer than the other, said diametrically extending lugs operatively mounted within the axially extending slots, said axially extending slots of said guide means providing unrestricted axial initial movement of said valve member, whereby said valve member is movable under the action of the fluid under pressure to seat on said annular seat and to seal said female connector as the coupling is uncoupled, and said valve member is arranged to move axially relative to said slotted guide means to unseat said valve member against the action of the fluid pressure as the male connector is inserted within the annular gasket means and upon a final pivotal movement of the valve member about one of the diametrically extending lugs within the smaller axially extending slot, the longer slot limiting the pivotal and angular movement of the valve member as the male connector approaches its fully inserted position, and said coupling member is sealed as the connectors are coupled together.

5. A coupling as claimed in claim 1, wherein said female connector is provided with an axially extending bore and further includes valve means comprising an annular gasket means complementally formed to the male connector and mounted within a counter-bore of the axially extending bore of the female connector for sealing the male and female connectors when coupled together, valve means including a movable valve member comprising diametrically extending lugs and operatively mounted for axial and angular movement and slotted guide means therefor also mounted within said counter-bore for operatively mounting the diametrically extending lugs, said slotted guide means provided with diametrically positioned slots, one of said slots being axially longer than the other, said gasket means adapted to seal the female connector when uncoupled and including an annular valve seat for said valve member, and means for retaining said annular gasket means and valve means within said counter-bore.

6. A coupling as claimed in claim 5, wherein said annular gasket means, and said valve means including movable valve members, and the slotted guide means are detachable, and the means for retaining said annular gasket means and valve means within said counter-bore are detachable, the said means for retaining being a detachable split ring operatively mounted within the bore of the female connector and concentric with respect to the male connector when the male connector is inserted within the female connector.

7. A coupling as claimed in claim 1, wherein said male connector is provided with an axially extending bore, and further includes an elongated cylindrical portion through which the bore extends, valve means comprising an annular gasket means complementally formed to a counter-bore of the axially extending bore for mounting the gasket means, said valve means also including a movable valve member comprising diametrically extending lugs and operatively mounted for axial and angular movement and slotted guide means therefor also mounted within said counter-bore for operatively mounting the diametrically extending lugs, said slotted guide means provided with diametrically positioned slots, one of said slots being axially longer than the other, said gasket means adapted to seal the male connector when uncoupled and including an annular valve seat for said valve member, said elongated cylindrical portion including an enlarged portion formed as a frustrum of a cone and provided with an annular groove, said cylindrical portion of the male connector in which the counter-bore is formed provided with an annular portion, said annular portion affixed within said annular groove, whereby the elongated cylindrical portion and the valve means including the gasket means are affixed within the counter-bore with the gasket means in abutting relationship with the aforesaid enlarged portion of the elongated cylindrical portion.

8. A coupling as claimed in claim 1, wherein the tubular male and female connectors are provided with axially extending bores and adapted to be connected to a line containing fluid under pressure, and said male and female connectors each including similar annular gasket means, said annular gasket means for said female connector for sealing said connectors together, each of said gasket means including an annular valve seat, similar valve means for said male and female connectors, each of said valve means including a movable valve member including diametrically extending lugs and operatively mounted for axial and angular movement and slotted guide means therefor for mounting each of said valve means within complementally formed counter-bores of the male and female connectors, each of said slotted guide means including oppositely flattened portions provided with axially extending slots, one of said slots being longer than the other, said diametrically extending lugs operatively mounted within the axially extending slots, said axially extending slots of said guide means providing unrestricted axial initial movement of said valve members, whereby said valve member for the male and female connectors is movable under the action of the fluid pressure to seat on said annular seat and to seal said male and female connectors as the coupling is uncoupled, and said valve member is arranged to move axially relative to said slotted guide means to unseat said valve member of the female connector against the action of the fluid pressure as the male connector is inserted within the annular gasket means of the female connector and upon a final pivotal movement of the valve member for the female connector about one of the diametrically extending lugs within the smaller axially extending slot, the longer slot limiting the pivotal and angular movement of the valve member as the male connector approaches its fully inserted position and said coupling member is sealed as the connectors are coupled together, and said valve means for the male connector will open under the action of the fluid pressure in the line to which the coupling is connected.

References Cited in the file of this patent

UNITED STATES PATENTS

| | | |
|---|---|---|
| 1,626,456 | Fairbanks | Apr. 26, 1927 |
| 2,061,086 | Nord | Nov. 17, 1936 |
| 2,070,013 | Krannak | Feb. 9, 1937 |
| 2,166,402 | Gora | July 18, 1939 |
| 2,201,372 | Miller | May 21, 1940 |
| 2,238,706 | Ohls | Apr. 15, 1941 |
| 2,288,565 | Green | Jan. 30, 1942 |
| 2,377,812 | Scheiwer | June 5, 1945 |
| 2,396,499 | Fitch | Mar. 12, 1946 |
| 2,406,662 | Burchett | Aug. 27, 1946 |
| 2,425,500 | Wiggins | Aug. 12, 1947 |
| 2,425,692 | Clapp | Aug. 12, 1947 |
| 2,428,077 | Herold | Sept. 30, 1947 |
| 2,457,052 | Le Clair | Dec. 21, 1948 |
| 2,478,052 | Palm | Aug. 2, 1949 |
| 2,492,271 | Cox et al. | Dec. 27, 1949 |
| 2,516,758 | Davis | July 25, 1950 |
| 2,525,667 | Goolsbee | Oct. 10, 1950 |
| 2,552,543 | Earle | May 15, 1951 |
| 2,638,916 | Scheiwer | May 19, 1953 |
| 2,641,485 | Dupuy | June 9, 1953 |

FOREIGN PATENTS

| | | |
|---|---|---|
| 539,014 | Great Britain | Aug. 25, 1941 |
| 541,842 | Great Britain | Dec. 15, 1941 |
| 847,163 | France | June 26, 1939 |